Feb. 17, 1970   C. S. KASPER   3,495,317
MEANS FOR APPLYING SEALS TO AUTOMOTIVE VALVES
Filed Sept. 1, 1967   8 Sheets-Sheet 1
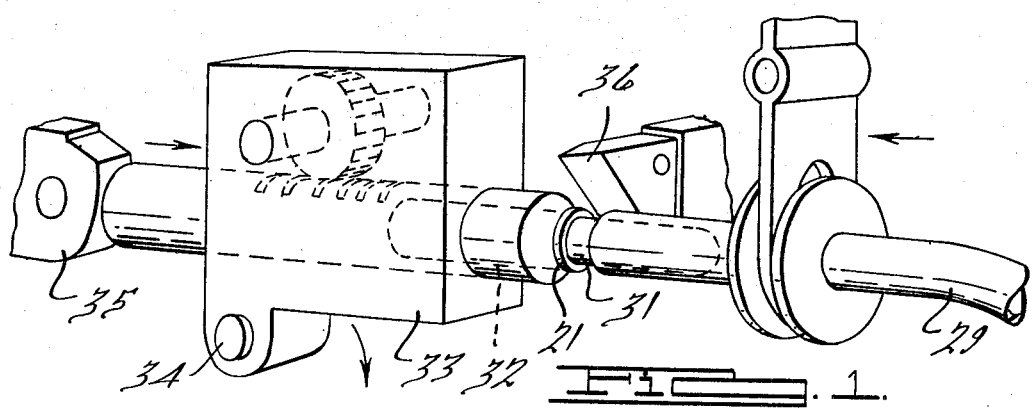
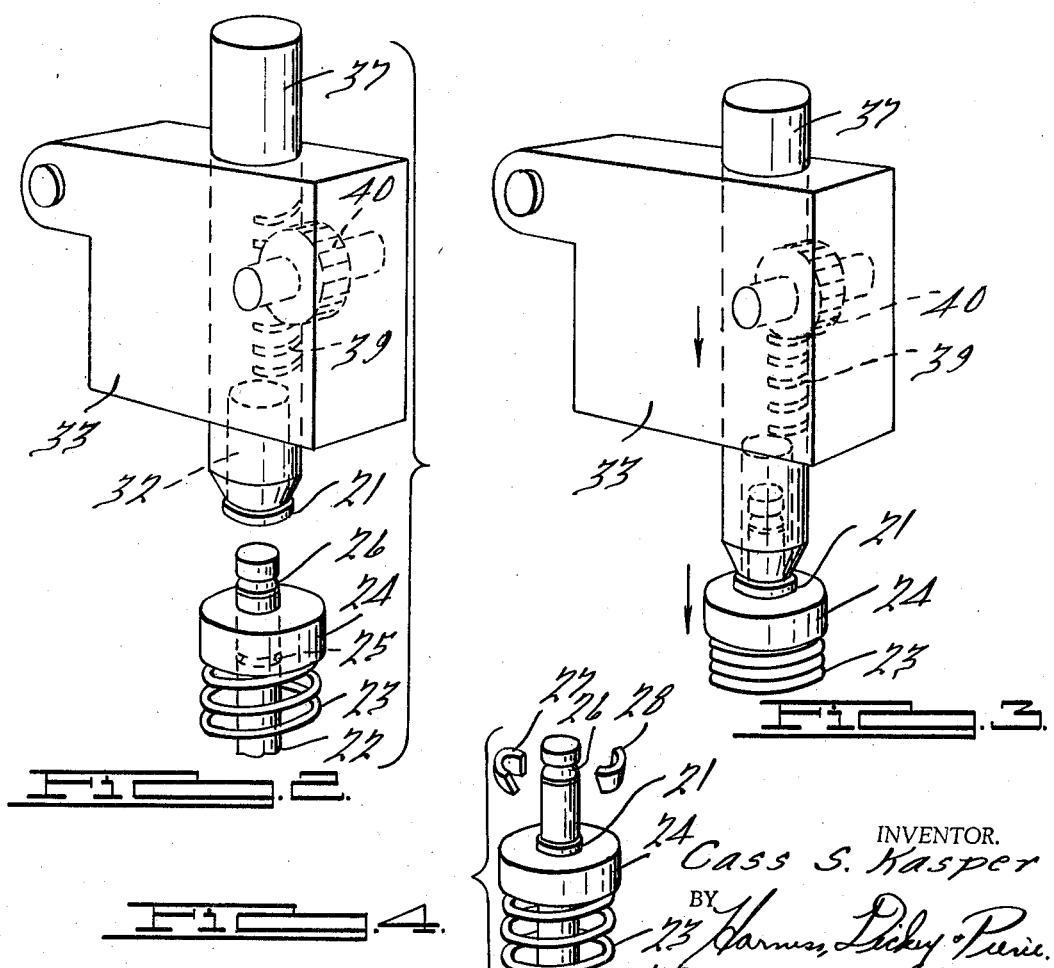
INVENTOR.
Cass S. Kasper
BY
Harness, Dickey & Pierce
ATTORNEYS.

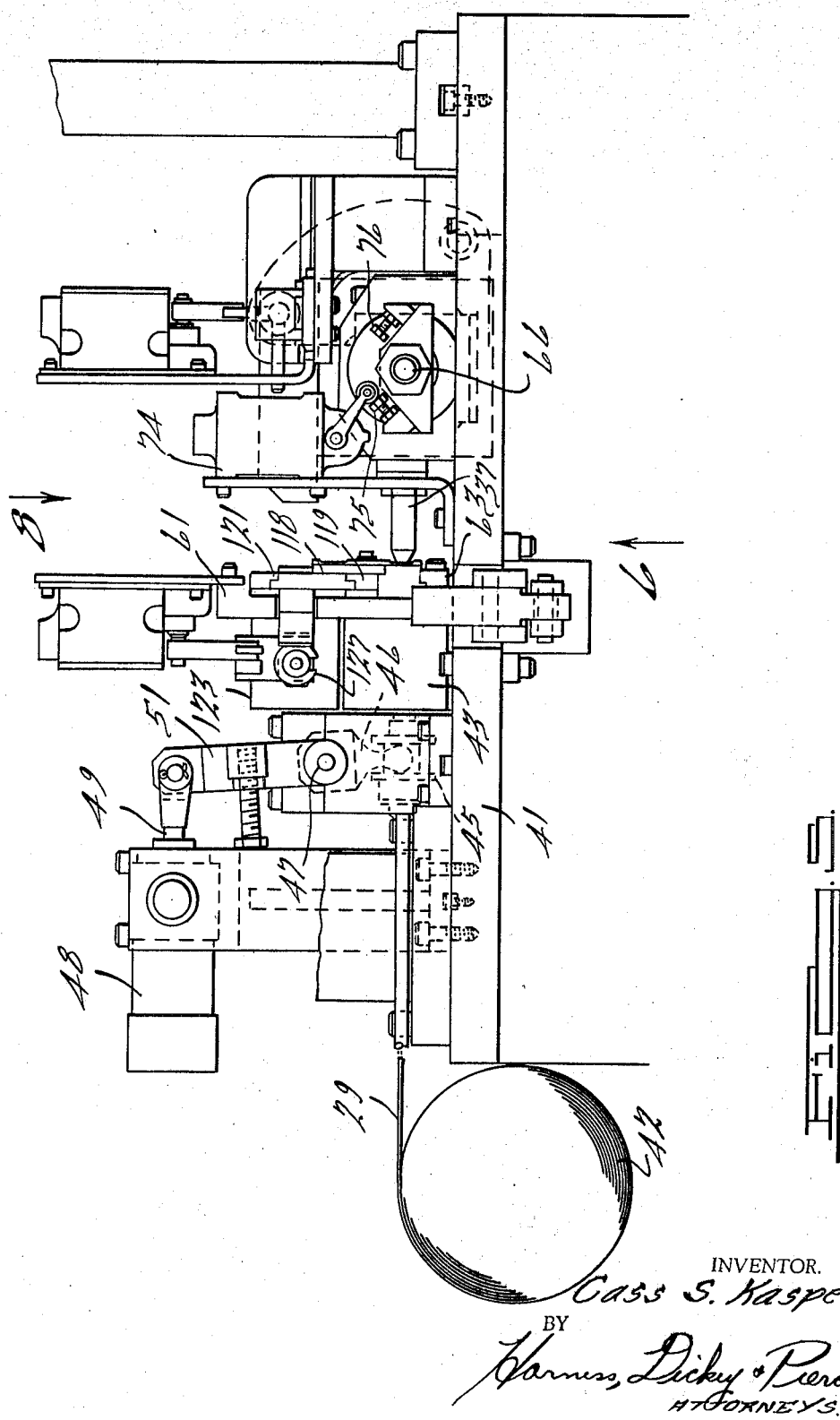

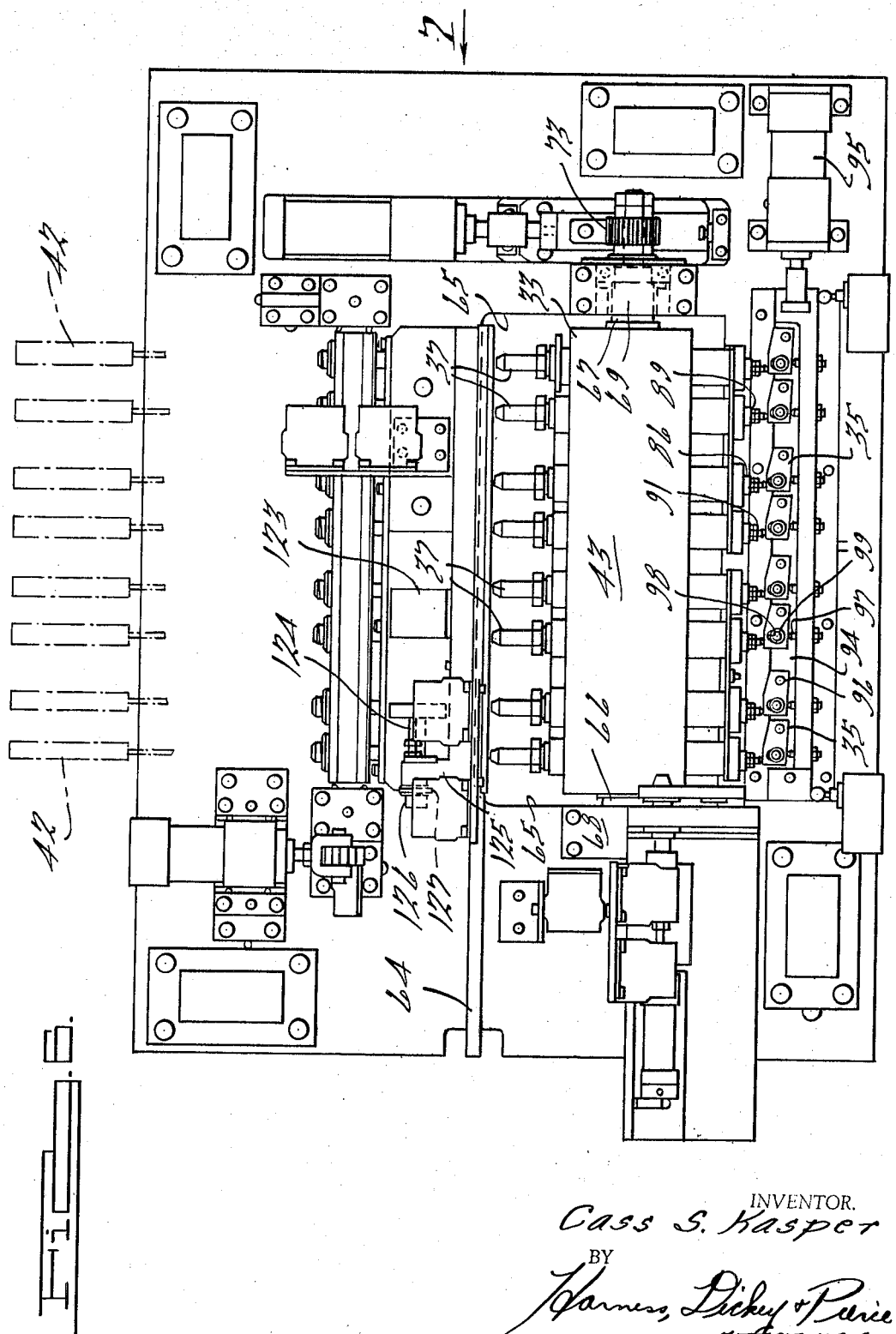

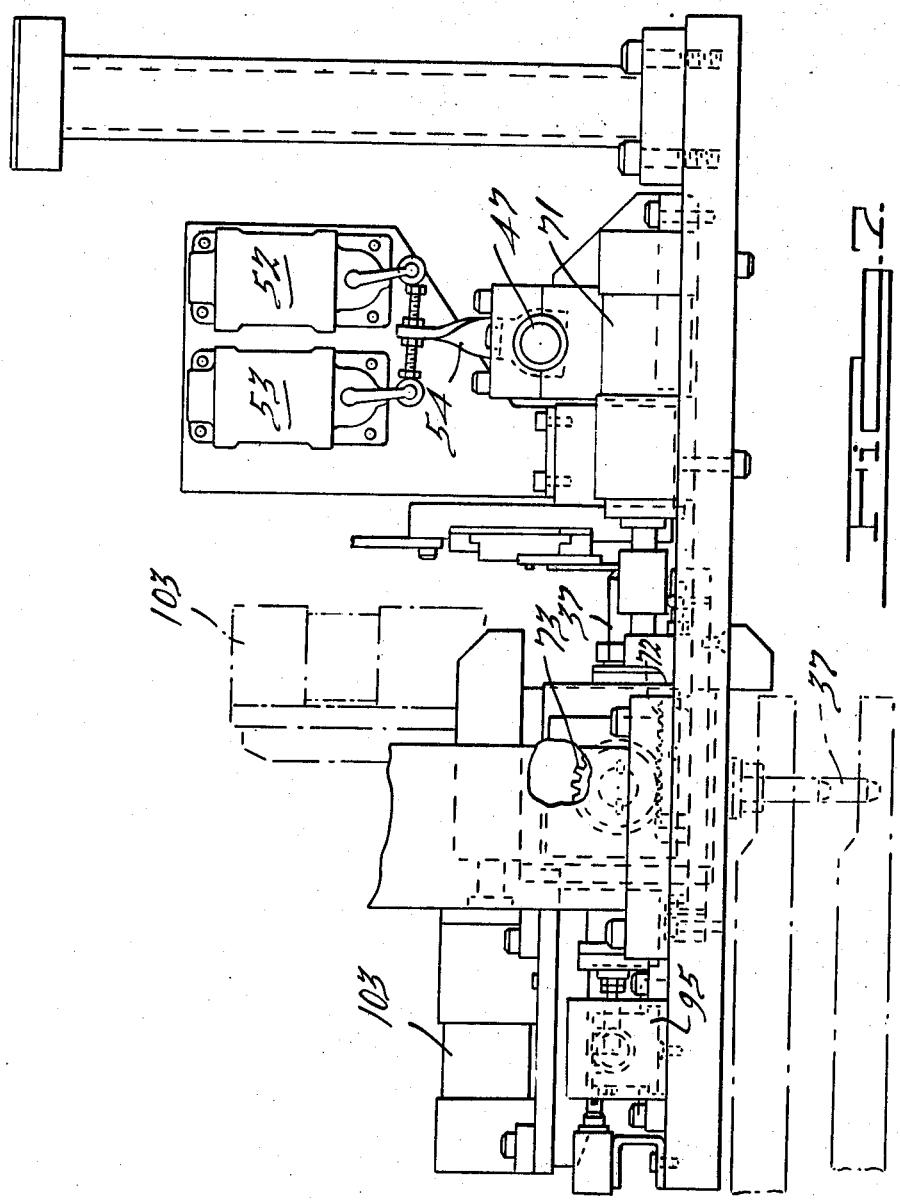

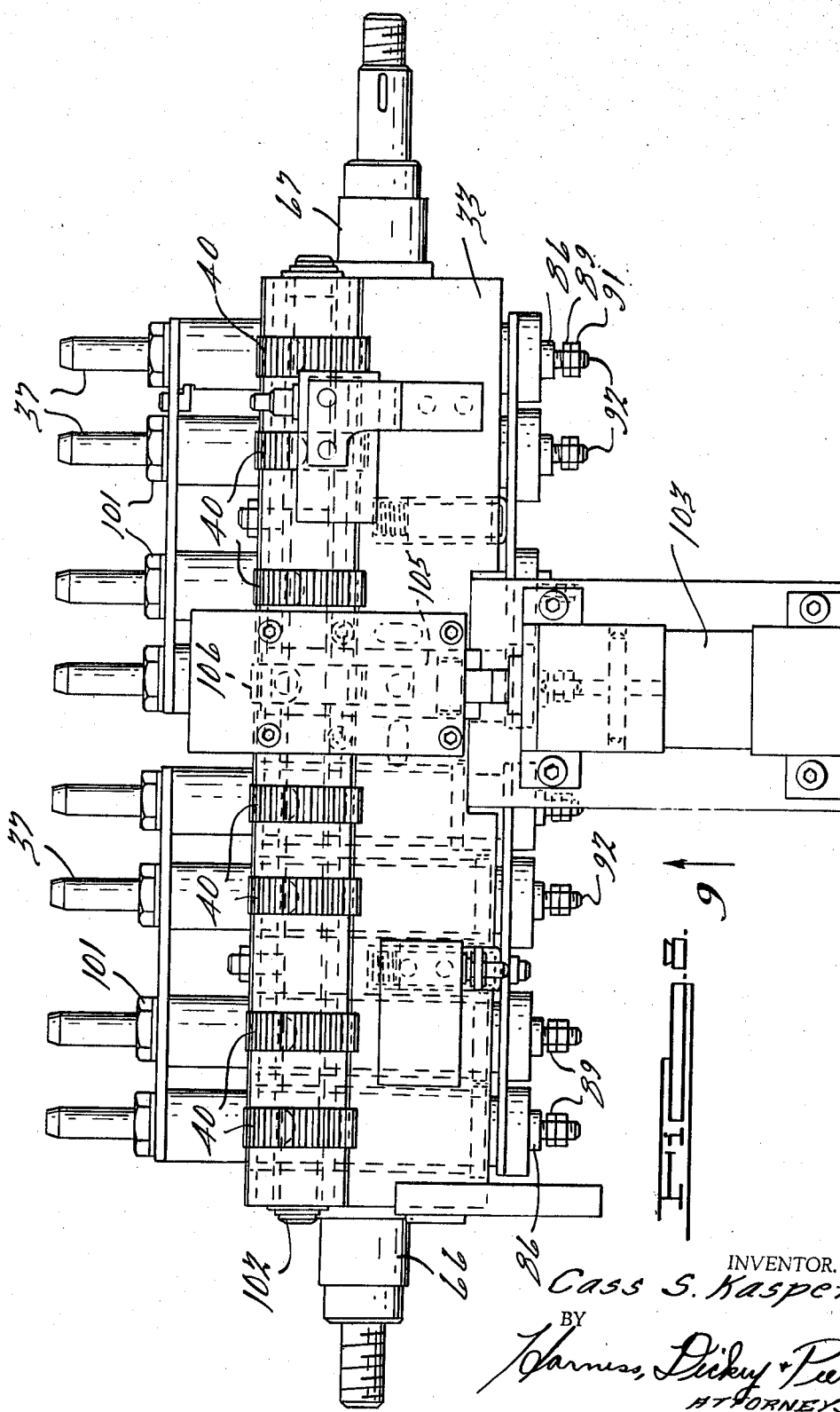

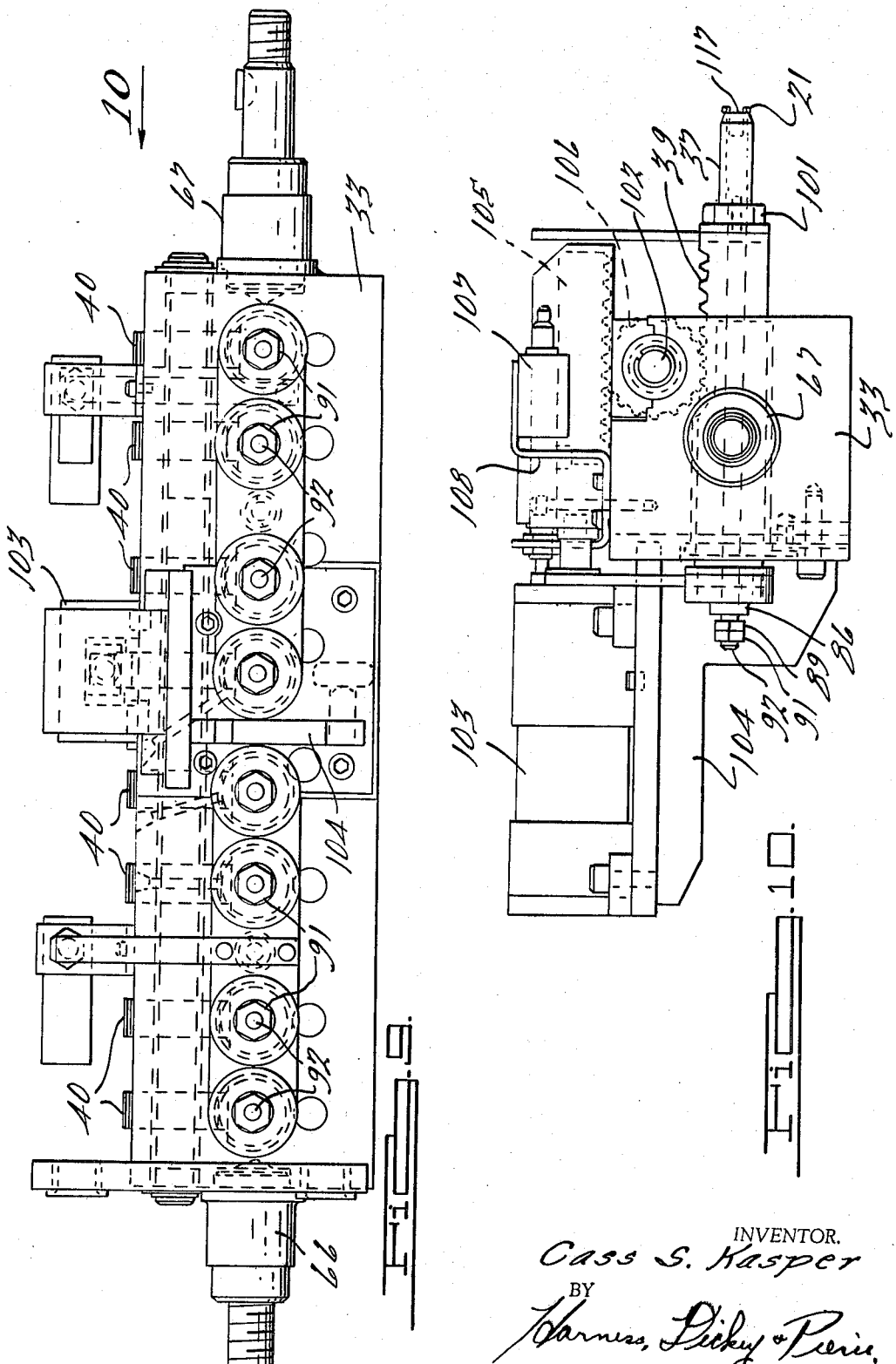

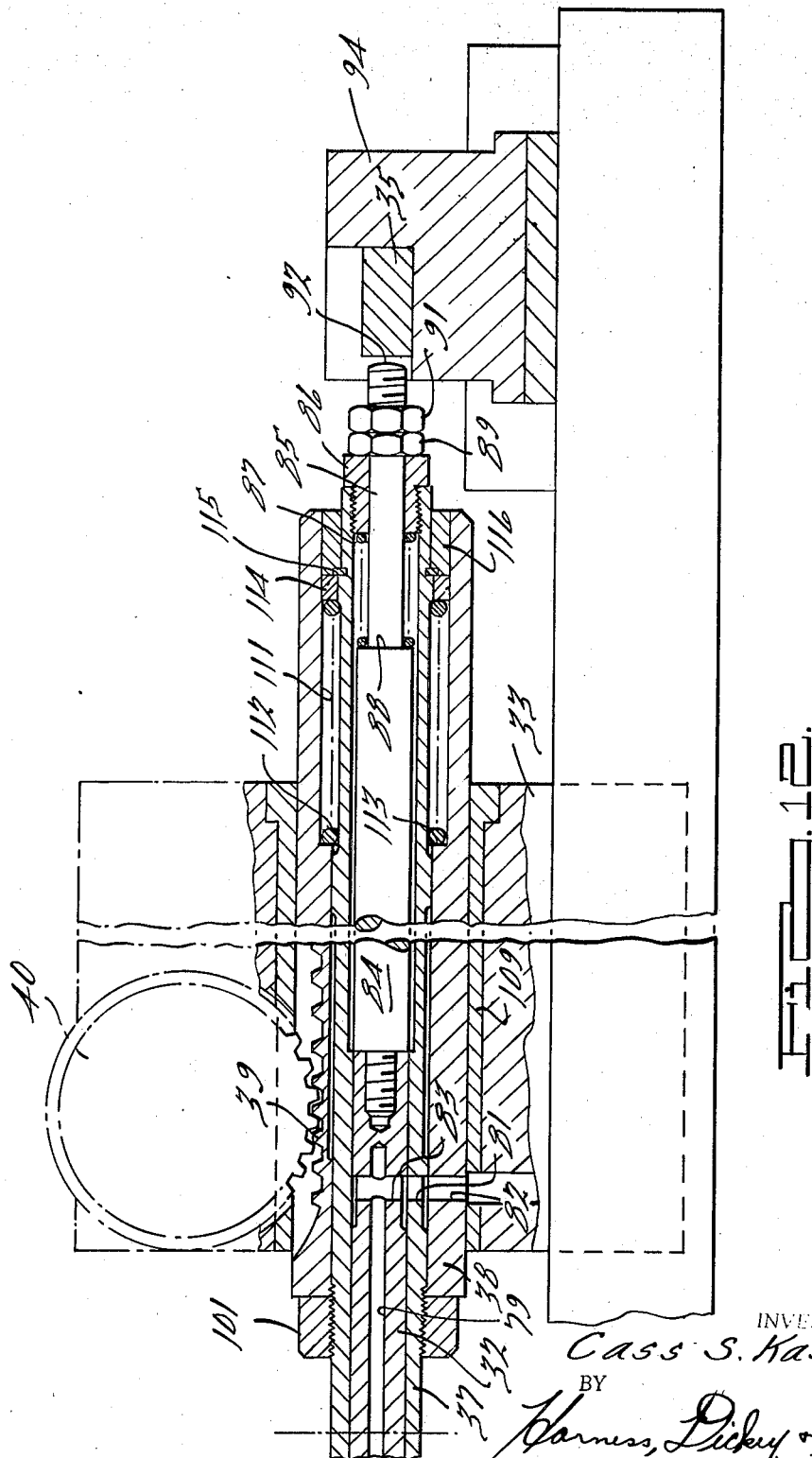

United States Patent Office 3,495,317
Patented Feb. 17, 1970

3,495,317
MEANS FOR APPLYING SEALS TO AUTOMOTIVE VALVES
Cass S. Kasper, 819 Loraine, Grosse Pointe, Mich. 48236
Filed Sept. 1, 1967, Ser. No. 665,021
Int. Cl. B23p 19/04
U.S. Cl. 29—208                                                            13 Claims

ABSTRACT OF THE DISCLOSURE

Rubber tubing is fed over a slave pin onto a quill and the end sliced off to form an O-ring seal. The quill is swung downwardly and advanced over a valve stem, the O-ring being stripped off the quill onto the stem. Eight quills are mounted on a common carriage for mass production of engine blocks.

BACKGROUND OF THE INVENTION

Field of the invention

The invention relates to a mass production of engine blocks having valve stems with O-ring seals placed between a spring retainer and split keeper keys which lock the assembly in place. More particularly, the invention relates to a method of forming these O-ring seals and assembling them onto the valve stems after the spring retainer caps have been placed thereon but before the keeper keys are placed in position.

Description of the prior art

Conventionally, engine blocks with valve stems mounted therein are moved along an assembly line and after the springs and spring retainer caps are placed thereon, prefabricated O-ring seals are slipped over the valve stems. The known method of assembling these O-rings is shown and described in copending application Ser. No. 493,849 of Cass Kasper and Robert A. LaLacheur, filed Oct. 7, 1965, now Patent No. 3,377,691, for "Device for Assembling Valve Parts." It consists of means for feeding, one at a time, previously formed O-ring seals to a pair of separable arms positioned over the valve stem. A mandrel device then descends between these arms to carry the O-ring onto the valve stem. This mechanism is quite complex and expensive, and the present invention has been found to provide much more efficient handling of the O-ring seals.

SUMMARY OF THE INVENTION

According to the invention, a coil of rubber tubing is provided, this tubing being fed intermittently over a slave pin which causes it to expand slightly. A quill is aligned with and abuts the slave pin, and a portion of the tubing is pushed over the quill. This portion is cut off to form an O-ring. The quill then swings out of alignment with the slave pin and into alignment with the valve stem. The end of the quill is hollow and it passes over the valve stem for a certain distance until it engages the stem, and then an outer sleeve on the quill continues moving and strips the O-ring off the quill. The quill and sleeve then return to their position aligned with the slave pin to receive the next O-ring.

In the illustrated embodiment, designed for simultaneously placing eight O-rings on eight valve stems, there are eight coils of tubing, eight slave pins, and eight quills and sleeves, all mounted for simultaneous operation.

BRIEF DESCRIPTION OF THE DRAWINGS

FIGURES 1, 2, 3 and 4 are schematic views showing in sequential form the principles of operation of the invention; FIGURE 1 showing the rubber tubing being fed and cut; FIGURE 2 showing the quill being swung down over the valve stem; FIGURE 3 showing the quill fed down over the valve stem; and FIGURE 4 showing the location of the keepers;

FIGURE 5 is a side elevational view of the invention showing the tubing feed mechanism, cutter arrangement, and quill assembly, the latter being in its seal-receiving position;

FIGURE 6 is a bottom plan view of the assembly of FIGURE 5 looking in the direction of the arrow 6 thereof;

FIGURE 7 is a side elevational view taken in the direction of the arrow 7 of FIGURE 6;

FIGURE 8 is a top plan view of the quill carriage and its associated parts, taken in the direction of the arrow 8 of FIGURE 5;

FIGURE 9 is a front elevational view of the quill assembly taken in the direction of the arrow 9 of FIGURE 8;

FIGURE 10 is a side elevational view of the quill assembly taken in the direction of the arrow 10 of FIGURE 9;

FIGURE 12 is a cross-sectional view in elevation of the remaining portion of the quill and its associated parts.

DESCRIPTION OF THE PREFERRED EMBODIMENT

Figure 11:
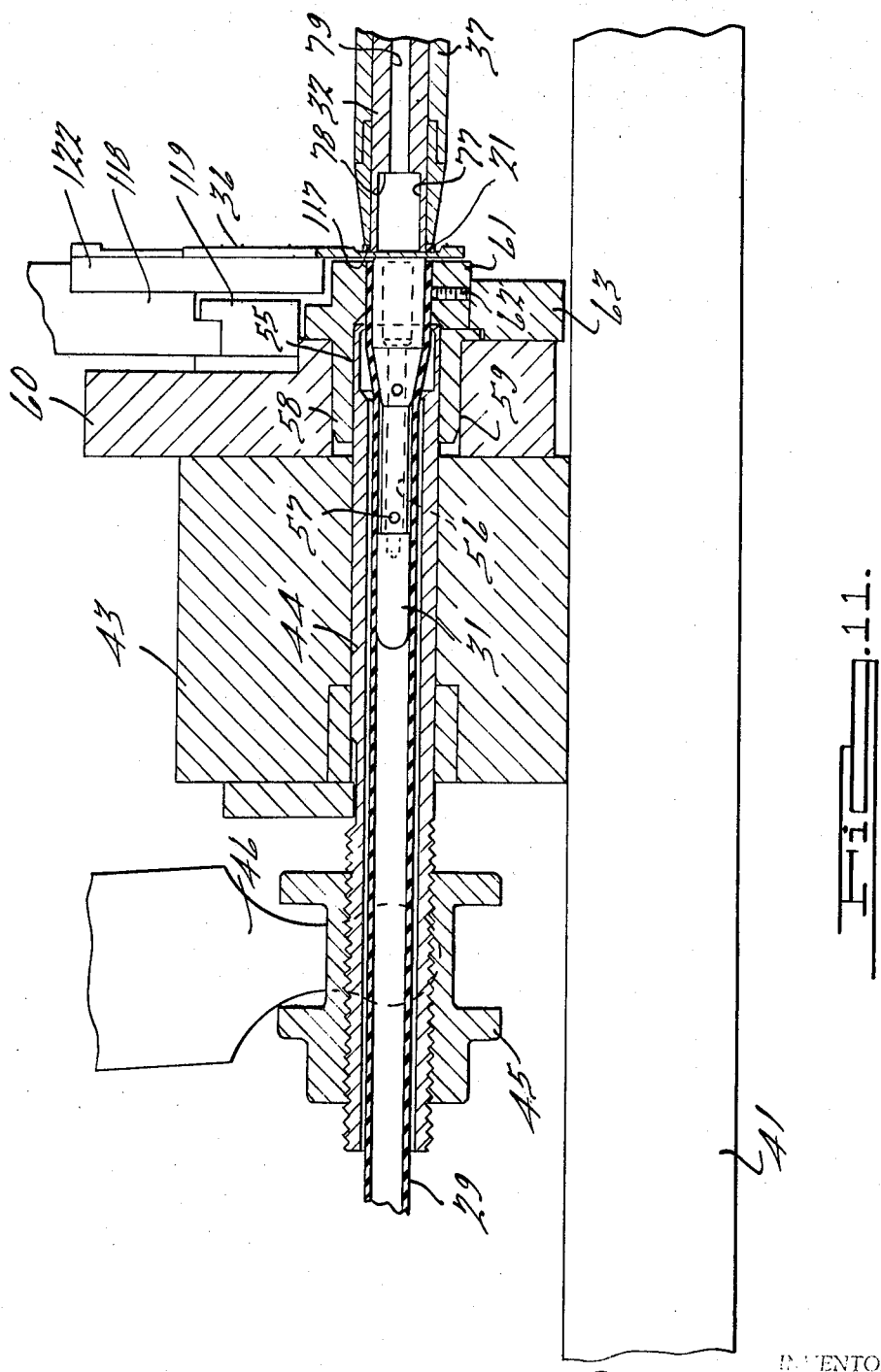
FIGURE 11 is a cross-sectional view in elevation of one of the slave pins and the adjacent portion of the corresponding quill.

Referring first to schematic FIGURES 1 to 4 for an overall understanding of the invention, it is an object to place rubber ring seals 21 on valve stems 22 of automotive engine blocks as they move past the mechanism. Although the illustrated embodiment has means for simultaneously mounting eight rings on eight stems, only one is shown in the schematic views. At previous stations, each stem will have received a coil spring 23 thereon as well as a spring retainer cap 24. The seal 21 is to be placed immediately over the cap, and in a groove 25 provided therefor. Another groove 26 is formed on the stem above groove 25, and this later receives a pair of split keeper keys 27 and 28 which lock the assembled parts in position. Means for assembling these keys, which are later held in position by the spring retainer cap under the action of the spring, is shown and described in the aforementioned copending application.

According to the invention, rubber tubing 29 from coiled stock (FIGURE 5) is intermittently fed onto a slave pin 31 which abuts a quill 32. This quill is slidably mounted on a carriage 33 which is pivoted at 34 for movement between a horizontal position as shown in FIGURE 1 in which the quill is aligned with a slave pin and a vertical position as shown in FIGURES 2 and 3 in which the quill is aligned with a valve stem. A cam 35 advances quill 32 into abutment with slave pin 31 immediately before tubing 29 is fed forwardly. The end of the tubing thus passes over the slave pin and onto the end of the quill. Cam 35 then permits slight retraction of quill 32 away from its abutting relation with slave pin 31. This permits a cutter 36 to pass between the quill and slave pin, slicing off the end of the tubing to form an O-ring seal 21.

Carriage 33 is then swung downwardly to the FIGURE 2 position. When it reaches this position the quill is advanced toward the valve stem. Quill 32 is carried by an outer sleeve 37 in a sleeve support 38 (FIGURE 12), the latter having a rack 39. This rack is driven by a gear 40 toward the valve stem. The quill has a hollow end which permits it to pass over the valve stem, the depth of this hollow end being such that the quill will finally engage the valve stem when seal 21 is at groove 25.

This will limit further movement of the quill but the outer sleeve will continue to move to its FIGURE 3 position because of the spring connection between the quill and outer sleeve. The outer sleeve will thus strip the seal from the quill and permit it to enter groove 25. The parts will then be retracted from the valve stem and carriage 33 swung back from this discharging position to a receiving position in alignment with the slave pin so that the cycle may be repeated.

Referring now to the construction of the machine shown in FIGURES 5 through 12, which is especially adapted for simultaneously assembling eight seals onto valve stems, the device comprises a rectangular base 41 on which the parts are mounted. The left hand portion of this base, as seen in FIGURE 5, carries the mechanism for feeding the tubing toward the quill, whereas the right hand portion carries the quill carriage and its associated parts. The cutter mechanism is disposed at an intermediate portion of the base.

Referring first to the means for feeding the tubing, the coils of tubing stock are shown schematically at 42, these coils being rotatable on horizontal axes so that the tubing is fed toward the slave pins. An elongated block 43 mounted on base 41 slidably carries eight tubing advance sleeves 44 (FIGURE 11) in parallel relation. Each sleeve has a collar 45 threadably secured to its outer end, and each collar receives a lever 46. These levers are secured to a common shaft 47 extending across the collars. A cylinder 48 actuates a piston rod 49 which is connected to an arm 51 at one end of shaft 47. Extension and retraction of piston rod 49 will therefore cause reciprocating movement of sleeves 44. Limit switches 52 and 53 (FIGURE 7) are provided for controlling the movement of these sleeves, the limit switches being operated by an arm 54 secured to shaft 47.

The inner ends of sleeves 44 comprise split fingers 55, the ends of which extend inwardly and are used to grasp and advance tubing 29. Slave pin 31 is inserted in the end of tubing 29, this slave pin having an inner portion of relatively narrow shape which then slopes outwardly to a relatively wide portion. The interior 56 of the slave pin is hollow to receive a lubricant such as oil-entrained air, which will pass outwardly through radial apertures 57 to the tubing, thus facilitating the sliding movement of the tubing on the slave pin. Fingers 55 of sleeve 44 point inwardly and when the sleeve is fed to the right in FIGURE 11, the fingers will grasp the tubing and slide it on to the wider part of the slave pin, where it will grip the pin because of its stretch.

A pair of split retaining members 58 and 59 are provided for slidably retaining each sleeve 44 adjacent slave pin 31. These retainers are supported by a plate 60. Retainer 58 extends past the end of sleeve 44 but retainer 59 is shorter. A movable pincher member 61 is disposed adjacent retainer 59. This pincher has a pointed gripping member 62 mounted therein. Pincher 61 and the oppositely disposed portion of retainer 58, are capable of squeezing or pinching the end of tubing 29 onto slave pin 31.

A cam bar 63 is provided for actuating pincher members 62 between pinching and retracting positions. This cam bar extends along the lower portion of plate 61 beneath all the pinchers 62 and has raised and depressed portions (not visible) which will simultaneously actuate all the pinchers. Bar 63 may be actuated by a fluid-operated reciprocating motor 64. The sequence of operations will be such that after tubing 29 is advanced by fingers 55, the pinchers will be moved to their pinching position so that when fingers 55 are retracted the tubing will be held in place on a slave pin.

Quill carriage 33 is shown in detail in FIGURES 8, 9 and 10 and is shown in its mounted position in FIGURES 5, 6 and 7. Base 41 has a rectangular clearance aperture 65 above which carriage 33 is mounted and through which the quills swing between their loading and discharging positions. The carriage is of rectangular shape and has a pair of stub shafts 66 and 67 extending from the ends thereof, these shafts being supported by bearings 68 and 69, respectively, mounted on base 41. A cylinder 71 (FIGURE 7) is mounted on base 41 and operates a rack 72 meshing with a gear 73 on stub shaft 67. Actuation of cylinder 71 will thus rock carriage 33 between its receiving position shown in FIGURE 5 and its discharging position which will be 90° counterclockwise from the FIGURE 5 position. A limit switch 74 is mounted on base 41 and is controlled by a pair of switch actuators 75 and 76 (FIGURE 5) carried by stub shaft 66 for controlling the actuation of cylinder 71.

The construction of each quill 32 is seen best in FIGURE 12. The quill has a hollow end 77, the outer diameter of this end being equal to the diameter of the wider portion of slave pin 31, and the internal diameter being slightly greater than the diameter of the valve stem. Recess 77 terminates in a shoulder 78 and the depth of the recess is such that when shoulder 78 engages the top of the valve stem the lower end of quill 32 will be immediately above groove 25 thereof.

A lubricant passage 79 extends axially through a portion of quill 32 and is connected to hollow portion 77. Stripping sleeve 37 surrounding quill 32 and sleeve support 38 on sleeve 37 have radial passages 81 and 82 respectively, which are aligned with a radial passage 83 in quill 79, passage 83 connecting with passage 79. These passages are thus used to deliver the lubricant which is directed toward the interior of the slave pin.

Quill 32 has a bar 84 threadably secured thereto and extending rearwardly therefrom. This bar has a narrow outer portion 85 which extends through a bushing 86 threadably mounted in the end of stripping sleeve 37. A helical coil compression spring 87 is disposed on portion 85 of bar 84 and engages bushing 86 as well as the shoulder 88 formed by narrower portion 85. A pair of nuts 89 and 91 are secured to the outer threaded end of portion 85, this end being rounded at 92 for engagement by cam 35. This cam, which alternately advances and permits retracting of quill 32 in a manner hereinafter described, is one of eight shown in FIGURE 6, which are mounted on a bar 94, reciprocated by a cylinder motor 95 carried by base 41. Cams 35 are secured to bar 94 by pivots 96 and are adjustable by set screws 97 toward and away from the quill. The cams have elongated slots 98 receiving threaded members 99 attached to bar 94, for retaining the cams in position.

Sleeve support 38 surrounds sleeve 37 and carries the rack 39 mentioned previously. A nut 101 is threadably mounted on sleeve 37 and engages the forward end of sleeve support 38, thus forming the rearward limit of movement of sleeve 37 and quill 32. Eight gears 39 are provided, these being mounted on a common shaft 102 rotatably supported by carriage 33. A cylinder 103 is mounted on carriage 33 for actuating gears 39. This cylinder is supported by an L-shaped bracket 104 (in FIGURE 10), and has a rack 105 meshing with a gear 106 mounted on shaft 102. Cylinder 103 is actuated when the carriage is in its discharging position (FIGURES 2 and 3). A limit switch 107 mounted on a bracket 108 is provided for controlling the movement of cylinder 103.

Each sleeve support 38 is slidably mounted in a tubular member 109 within carriage 33. A recess 111 is provided in each support 38, this recess having a helical coil compression spring 112. One end of this spring engages a shoulder 113 in support 38 and the other end engages a ring 114 which in turn engages a split ring 115 secured to sleeve 37. A bushing 116 is provided between the outer end of sleeve 37 and support 38. The arrangement is such that when rod 84 and therefore quill 32 are moved to the left in FIGURE 12 by cam 35, spring 112 will be compressed and quill 32 will be advanced until it engages slave pin 31. It will be noted that this action can only occur when carriage 33 is in its loading position, as seen in FIGURE 12, since it is only at this time that the ends 92 of bars 84 will be aligned with cams 35, it being recalled that the cams are mounted on base 41. When this leftward movement of quill 32 occurs, support 38 is being held against movement by the meshing of gears 40 with racks 39. This leftward movement will cause nuts 101 to become separated slightly from the ends of supports 38. When quill 32 engages slave pin 31, the tubing may be fed onto the end of the quill. Cams 35 will then be reversed, permitting springs 112 to retract quills 32, after which the cutting operation will take place as described below, with the slave pin and quill supporting the tubing on opposite sides of the cut. It should be observed that this movement of quill 32 toward and away from the slave pin will be accompanied by similar movement of sleeve 37, the end of which, however, will be slightly behind the end of the quill. The arrangement is preferably such that when tubing 29 is fed onto quill 32 it will engage shoulder 117 at the end of sleeve 37, and will bunch up slightly ahead of this shoulder. When sleeve 37 and quill 32 are then retracted from slave pin 31, the rubber will expand axially to its previous condition but will not leave shoulder 117. Thus, the distance between shoulder 117 and the end of the quill will accurately determine the thickness of the O-ring seal 21.

Spring 87 functions when the quill and its associated parts are swung into their discharging position and driven downwardly by gears 40. At that time, support 38 will be driven downwardly and will push nut 101 ahead of it, and since nut 101 is secured to sleeve 37 the latter will also travel. This will push spring 87 downwardly and since the latter engages bar 84, attached to quill 32, the quill will move down also. Finally, shoulder 78 will engage the top of the valve stem preventing further movement of quill 32 and bar 84. This is when spring 87 will be compressed, since sleeve 37 will continue to be driven downwardly. Thus, sleeve 37 will strip O-ring 21 off the end of the quill so that it will snap into groove 25. The rotation of gears 40 will then be reversed and the parts will be withdrawn outwardly.

A cutter bar 118 extends across an intermediate portion of the unit above base 41, being slidably supported by guides 119 and 121 secured to plate 61. The cutter bar carries eight cutter blade holders 122 each of which carries a cutter blade 36. A cylinder 123 (FIGURES 5 and 6) is provided for actuating cutter bar 118. The connection between the cylinder piston rod 124 and cutter bar 118 comprises an arm 125 extending from the cutter bar and engageable with the piston rod. The latter is headed at 126, and a C-washer 127 is mounted on the piston rod between head 126 and on 125. By merely removing the C-washer 127, it is therefore possible to pull out the cutter bar to replace the cutters.

In operation, assuming an initial position of the parts as shown in FIGURES 5 through 7 and 11 and 12, arms 46 will be rocked counterclockwise in FIGURE 11 to feed tubing 29 over slave pins 31. At this time quills 32 will be held against the slave pins so that the end of the rubber tubing will advance over the quills and engage shoulders 77 of sleeves 37. Pinchers 64 will be actuated to hold the tubing while fingers 55 are withdrawn. Quills 32 and their sleeves 37 will be slightly withdrawn from the slave pins and cutters 36 will slice the O-ring seals off the end of the tubing.

Cylinder 71 will then rotate carriage 33 to swing the quills into their discharging position. Cylinder 103 will advance supports 38 with quills 32 and sleeves 37 until shoulders 78 of the quills engage the tops of the valve stems. Sleeves 37 will then strip the seals off the quills and they will snap into grooves 25 of the valve stems. The quills will be withdrawn and the carriage rocked back to its loading position. Cams 35 will once more advance quills 32 and sleeves 37 toward the slave pins and the cycle will be repeated for the next engine block at the station.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. In a mechanism for forming O-ring seals from rubber tubing stock and mounting said seals on valve stems or the like, a slave pin mounted in the end of said tubing, said slave pin being slightly flared in the direction of the advance of said tubing to expand the same, an advancing member outside said tubing and having fingers engageable therewith to intermittently push the tubing onto said slave pin, a quill movable between a receiving position aligned with said slave pin and a discharge position aligned with a valve stem which is to receive an O-ring seal, the quill having a hollow end for receiving said valve stem, a stripping sleeve surrounding said quill, means operative only when said quill is in its receiving position for advancing the quill into engagement with said slave pin whereby tubing advanced over said slave pin will be fed onto said quill, means for then withdrawing said quill slightly from said slave pin, cutting means for slicing off the end of said tubing in the area of separation whereby an O-ring seal is formed and is carried by said quill, means operative when said quill is in its discharging position for simultaneously advancing said quill and sleeve until the hollow end of said quill passes over the valve stem, and yieldable means between said quill and sleeve whereby continued advancing movement of said sleeve after said quill engages said valve stem will cause said sleeve to strip said O-ring seal from the quill onto the valve stem.

2. The combination according to claim 1, said advancing member and fingers comprising a sleeve surrounding said tubing and having split fingers adjacent the wider end of said slave pin.

3. The combination according to claim 2 further provided with pinching means surrounding said tubing adjacent the wider end of said slave pin, said pinching means being movable between releasing and pinching positions, whereby said fingers may be withdrawn while said tubing is held in position.

4. The combination according to claim 3, said pinching means comprising a stationary member adjacent one side of said tubing and a radially movable member adjacent the other side of said tubing, and a cam actuating said movable member between its positions.

5. The combination according to claim 1, further provided with a support surrounding said stripping sleeve, said means for advancing said stripping sleeve when in its discharging position comprising a reciprocable motor connected to said support, and a one-way connection between said stripping sleeve and support.

6. The combination according to claim 5, the means for connecting said reciprocating motor to said support comprising a rack and gearing.

7. The combination according to claim 1, further provided with a support surrounding said stripping sleeve, a resilient connection between said stripping sleeve and support whereby said stripping sleeve is constantly urged toward a retracted position with respect to said support, the means for advancing said stripping sleeve and quill into engagement with said slave pin comprising a cam engageable with an extension of said quill and operable against said-last-mentioned resilient means.

8. The combination according to claim 1, further provided with lubricating passage means in said quill and said slave pin, said passage means being aligned when said quill is in its receiving position, and radial passages in said slave pin for conducting said lubricant to the interior of said tubing.

9. The combination according to claim 1, said cutting means comprising a cutter movable transversely to said tubing, said cutter being aligned with that portion of the tubing which is unsupported after said quill is withdrawn from said slave pin.

10. In a machine for simultaneously forming a plurality of O-ring seals and mounting them on automotive valve stems or the like, a base, a plurality of coils of rubber tubing adjacent said base, a plurality of tubing advance sleeves mounted in parallel relation on said base, means for simultaneously sliding said sleeves between advanced and retracted positions, said tubing passing through said sleeves, the forward ends of said sleeves having fingers engageable with said tubing to advance the same, a plurality of slave pins in the ends of said tubing, said slave pins each having a narrow portion which flares to a wider portion, whereby reciprocating movement of said sleeves will cause said tubes to advance and expand on said slave pins, a quill carriage rockably mounted on said base, a plurality of quills slidably mounted on said carriage in parallel relation, the carriage being rockable between a receiving position in which said quills are aligned with said slave pins and a discharging position in which said quills are aligned with valve stems, hollow portions at the forward ends of said quills for receiving the ends of said valve stems, stripping sleeves surrounding said quills, supports surrounding said sleeves, resilient means urging said sleeves toward retracted position with respect to said supports, one-way connections between said quills and sleeves whereby said resilient means will also urge said quills in said retracting direction, means operative only when said carriage is in its receiving position for causing said quills and sleeves to advance from said retracted position against the action of said resilient means until said quills engage said slave pins, whereby advancement of said tubing will cause the ends thereof to pass onto said quills until they engage said stripping sleeves, means for then causing said cams to permit said resilient means to retract said sleeves and quills, a plurality of cutters on a common cutter bar, means for actuating said cutter bar after said quills and said sleeves are retracted to slice off the ends of said tubing thereby forming O-ring seals carried by said quills, means for advancing said stripping sleeve supports after said carriage is swung to its discharging position, one-way connections between said supports and sleeves whereby advancement of said supports will cause advancement of said sleeves, and resilient connections between said sleeves and said quills in said advancing direction whereby engagement of the ends of said hollow quill portions with said valve stems followed by continued advance of said sleeves will cause the sleeves to strip said O-ring seals from said quills.

11. The combination according to claim 10, the means for rocking said carriage between its receiving and discharge positions comprising a reciprocating fluid-actuated motor carried by said base and connected by a rack and gear to said carriage.

12. The combination according to claim 10, the means for advancing said stripping sleeve supports comprising a shaft rotatably mounted on said carriage, gears on said shaft meshing with racks on said stripping sleeve supports, and a reciprocating fluid-actuating motor on said carriage connected by a rack and gear to said last-mentioned shaft.

13. The combination according to claim 10, the means for simultaneously advancing and retracting said tubing advance sleeves comprising a shaft rotatably mounted on said base and extending across said sleeves, collars on said sleeves, levers connecting said shaft with said collars, and a reciprocating fluid-actuated motor for rocking said last-mentioned shaft.

References Cited

UNITED STATES PATENTS

| 979,438 | 12/1910 | Courtney. | |
| 1,069,539 | 8/1913 | Evans | 29—235 |
| 1,322,843 | 11/1919 | Townsend | 29—235 X |
| 2,619,964 | 12/1952 | Thaete | 29—235 X |
| 3,030,700 | 4/1962 | Jensen | 29—235 X |
| 3,115,701 | 12/1963 | Jones | 29—235 X |
| 3,263,318 | 8/1966 | Merrill | 29—235 X |
| 3,377,691 | 4/1968 | Kasper et al. | 29—235 X |

CHARLIE T. MOON, Primary Examiner

U.S. Cl. X.R.

29—229, 235